Patented Nov. 19, 1929

1,736,282

UNITED STATES PATENT OFFICE

CHARLES FISCHER, JR., OF WYOMING, AND LOU A. STEGEMEYER, OF CINCINNATI, OHIO, ASSIGNORS TO THE TWITCHELL PROCESS COMPANY, OF CINCINNATI, OHIO, A CORPORATION OF OHIO

PROCESS OF TREATING METAL TO REMOVE SCALE

No Drawing. Application filed May 25, 1928. Serial No. 280,645.

This invention relates to a process of treating metals for removing scale, rust, or the like therefrom, and is particularly directed to treatment for the metal wherein an acid is employed to remove the scale in combination with an inhibitor adapted to cause the acid to act differentially upon the scale and upon the metal, so that the scale is removed without substantial injury to the metallic surface beneath.

It is conventional custom to remove scale from metals, such as brass, iron, copper, steel, etc., by pickling them in an acid solution, usually sulphuric acid, the effect of which treatment is that the sulphuric acid attacks the scale and dissolves the same. The acid also, however, attacks the metal beneath and often dissolves ten times the weight of metal over the weight of the scale. This general result is undesirable for numerous reasons, such as that the metal dissolved is wasted, the acid is prematurely exhausted by this action on the metal, the metallic surfaces become pitted, the metal becomes brittle from absorption of hydrogen gas, and the atmosphere of the room is affected by the fumes rising from the operation.

The object of this invention is to provide a process of removing the scale from metals whereby an acid is caused by the presence of an inhibitor to act differentially upon the scale and upon the metal, so that the metallic surface is not injured, a smooth, bright surface being obtained, so that the acid is not prematurely exhausted, and so that the evolution of large quantities of hydrogen gas and their undesirable effects are avoided.

This invention comprises treating the metal having a scale or rust thereon, which it is desired to remove, in a bath containing an acid in the presence of one or more members of a certain and particular group of chemical compounds, termed mineral oil sulphonic reagents.

More specifically, these mineral oil sulphonic reagents are formed by the treatment of petroleum or fractions thereof with strong sulphuric acid, fuming sulphuric acid and/or sulphur trioxide. These bodies are at present chiefly available as by-products of certain specific petroleum refining operations, conducted according to certain particular processes, chiefly the Petroff-Humphreys process of refining medicinal white oil, light colored technical oils, and the cosmetics, wherein a great degree of purity is requisite. Two of the patents dealing with this refining operation are, first, the Petroff Patent No. 1,233,700, dated July 17, 1917, and secondly, the Humphreys Patent No. 1,286,179, dated November 26, 1918.

The sulphonic reagents resulting from this refining treatment are of very high molecular weight, usually between 200 and 500, and are classified for convenience by their various characteristics of chemical behavior, such as their solubilities, etc. This classification is at present requisite for the reason that the structural formulas and general inter-relationship of the atoms has never been discovered or ascertained.

Generally speaking, the bodies fall into two classes, those which are oil soluble in the presence of water, and those which are oil insoluble in the presence of water. The latter bodies are characterized by greater and more ready solubility in water than is the first specified group.

It is this group, which is more readily soluble in water, which is regarded as possessed of the most aptitude for application as an inhibitor in the treatment of metals with a mineral acid to remove scale. A number of these bodies are described in the patents to Robert E. Divine, Nos. 1,301,662, 1,301,663, 1,303,779 and 1,330,624; and also Patents Nos. 1,396,399 and 1,474,933.

These bodies, generally speaking, are hydrocarbons of high molecular weight characterized by the presence of the sulphonic group. These bodies are, therefore, added to a bath in which the metal is to be treated in percentage preferably between 1/100 of one percent and one percent in combination with a mineral acid such as hydrofluoric, hydrochloric, sulphuric or nitric, the percentage of the acid being dependent upon the metal being treated and the speed with which it is expedient to remove the scale. The mineral acid strength usually runs between two percent and twenty percent.

A preferred member of the class of reagents disclosed is the calcium salt of a mineral oil sulphonic acid from the sludge layer, preferably produced by a sulphur trioxide sulphonation in the manufacture of relatively white oils or cosmetics.

This particular calcium salt is readily soluble in a bath containing, for instance, between six and eight percent sulphuric acid, and when dissolved to form a 1/10 percent solution in said acid bath, as is hereby recommended, this mineral oil sulphonic reagent has a very marked and desirable effect upon the proneness of the acid to attack the scale and the free metal relatively. That is, the presence of this reagent causes the acid to attack the scale much more readily than the metal, with the result that the metal remains comparatively uninjured either by the acid itself, or by the free hydrogen normally evolved by the attack of an acid on a metal, and also that the undesirable fumes conventional to the pickling operations are obviated. This percentage of components is very effective on sheet iron and sheet steel.

The temperature and the duration of the treatment can be controlled in regard to the particular metal and the particular scale being treated and also in regard to other factors of convenience and expediency in the particular environment in which the process is being practiced.

However, a temperature of approximately 140° or higher Fahrenheit is usually suitable for the pickling operation. The metal should be permitted to remain in the pickling bath until the scale is removed, but not longer, although the presence of this inhibitor decreases the likelihood of damage which might result from prolonged treatment.

In addition to the members of the group so far specified, the following reagents have been found to be possessed of valuable and desirable properties as inhibitors in a metal treating operation of the type described, namely, mineral oil sulphonic acids from the sludge layer and their salts. (Such bodies must not be confused with the sludge resulting from an ordinary petroleum refining operation which produces few or none of the truly mineral oil sulphonic bodies, but only sulphones, pitches, tars and the like.)

The calcium, potassium, sodium, ammonium, urea, mono-di and triethanol-amine, glutamic, aluminum and sodium-aluminum salts of this sludge layer mineral oil sulphonic acid are among the salts embraced within the scope of this invention.

It is also possible to substantially or practically inhibit the action of the acid on the metal itself by using a mineral oil sulphonic reagent of the class disclosed in a proportion of one or two percent or over. This inhibiting effect renders properly treated acid solutions suitable for a multitude of new uses, such as cleaning the rust out of automobile radiators, cleaning water systems, heating systems, and other systems wherein a metal is employed which is subject to rust, scale, or the like.

One treating liquid appropriate for such uses is a five percent aqueous solution of sulphuric acid in which between one and two percent mineral oil calcium sulphonate has been incorporated. A solution of this nature is relatively safe since it attacks the metal very little, if at all, even at elevated temperatures, such as 140° to 150° Fahrenheit.

On the other hand, this solution does remove rust, scale, and other matter of such nature from the metal, leaving the metallic surface bright and clean.

As before pointed out, the nature of the metal, the thickness and quality of the scale, the desired speed of treatment, and the accelerating temperatures most economical in relation to the other factors must all be considered in relation to the particular mineral oil sulphonic reagent and mineral acid employed, and the percentages which are optima under the circumstances are determined in relation to said factors.

Having described the invention, we desire to be limited only by the following claims:

1. The process of inhibiting the action of a scale removing bath of mineral acid upon the metal from which the scale is to be removed, said process comprising, introducing into said bath a mineral oil sulphonic reagent of the class recovered from the operation of refining mineral oil to produce relatively white oil.

2. The process of inhibiting the action of a scale removing bath of mineral acid upon the metal from which the scale is to be removed, said process comprising, introducing into said bath a mineral oil sulphonic reagent of the class recovered from the operation of refining petroleum with sulphur trioxide to produce relatively white oil.

3. The process of inhibiting the action of a scale removing bath of mineral acid upon the metal from which the scale is to be removed, said process comprising, introducing into said bath a water soluble mineral oil calcium sulphonate.

4. The process of inhibiting the action of a scale removing bath of mineral acid upon the metal from which the scale is to be removed, said process comprising, introducing into said bath a mineral oil sludge layer sulphonic re-agent of the class recovered from the operation of refining mineral oil with sulphur trioxide to produce relatively white oil.

5. The process of inhibiting the action of a scale removing bath of mineral acid upon the metal from which the scale is to be removed, said process comprising, introducing into said bath substantially 1/10 of 1% mineral oil sulphonate of the class recovered from the operation of refining mineral oil to produce relatively white oil.

6. A bath for removing scale from metal, said bath comprising, an aqueous solution of a mineral acid adapted to attack and remove said scale, and a mineral oil sulphonic reagent of the class recovered from the operation of refining mineral oil to produce relatively white oil.

7. A bath for removing scale from metal, said bath comprising, an aqueous solution of a mineral acid adapted to attack and remove said scale, and a mineral oil sulphonic reagent of the class recovered from the operation of refining petroleum with sulphur trioxide to produce relatively white oil.

8. A bath for removing scale from metal, said bath comprising, an aqueous solution of a mineral acid adapted to attack and remove said scale, and a water soluble mineral oil calcium sulphonate.

9. A bath for removing scale from metal, said bath comprising, an aqueous solution of a mineral acid adapted to attack and remove said scale, and a mineral oil sludge layer sulphonic reagent of the class recovered from the operation of refining mineral oil with sulphur trioxide to produce relatively white oil.

10. A bath for removing scale from metal, said bath comprising, an aqueous solution of a mineral acid adapted to attack and remove said scale, and substantially 1/10 of 1% mineral oil sulphonate of the class recovered from the operation of refining mineral oil to produce relatively white oil.

In witness whereof, we hereunto subscribe our names.

CHARLES FISCHER, Jr.
LOU A. STEGEMEYER.